Aug. 2, 1960    K. K. KING    2,947,158
UNIVERSAL JOINT CENTERING DEVICE
Filed Aug. 21, 1959

INVENTOR.
Kenneth K. King
BY
L. D. Burch
ATTORNEY

United States Patent Office 2,947,158
Patented Aug. 2, 1960

2,947,158
UNIVERSAL JOINT CENTERING DEVICE

Kenneth K. King, Saginaw, Mich., assignor to General Motors Corporation, Detroit, Mich., a corporation of Delaware Filed Aug. 21, 1959, Ser. No. 835,216

5 Claims. (Cl. 64—21)

This invention relates to universal joints and more particularly to a centering means for a constant velocity universal joint.

In motor vehicle manufacture, and particularly the driveline therefore, it is becoming increasingly important to provide means for lowering the driveline and eliminate the objectionable tunnel within the floor of the vehicle. One maner of accomplishing this result is to use a driveline of several pieces, so arranged geometrically as to present the lowest possible condition. In so doing, it may be necessary to provide a propeller shaft of several sections, angularly disposed with respect to each other, requiring universal joints to transmit the driving torque. The double Cardan universal joint is a well-known structure which may be employed between two such portions of a drive shaft to provide the proper driving torque transmission. The use of a double Cardan universal joint is desirable because of the possibility of obtaining constant angular velocity through the joint.

In generally available constant velocity joints, and particularly double Cardan constant velocity joints, the low wear characteristics and manufacturing tolerances make the use objectionable, because of the construction of the centering means for the well-known joints. The usual centering arrangement is a ball and socket type of construction which does not permit wear takeup, nor does it effectively eliminate vibrations and the like caused by manufacturing tolerances between the parts. In the usual double Cardan universal joint, any tolerances between the ball and the socket will cause vibration and noise, plus a considerable amount of chucking and resultant deformation of the parts. These features are extremely objectionable in motor vehicle manufacture and have prevented a widespread use of this type of universal joint.

The device in which this invention is embodied comprises a centering means which has wear takeup and clearance takeup features eliminating the usual problems of vibration, wear and chucking. The proposed centering means makes use of a pair of spring-biased centering shoes, adapted to wedge themselves between the centering ball and the remaining portion of the universal joint, such that any manufacturing tolerances, or the like, are effectively eliminated. This provides a universal joint with an extremely long life and one that is vibration free because of the elimination of manufacturing defects or tolerances in the centering means.

These and other advantages will become more apparent from the following descriptions and drawings in which.

Figure 1:
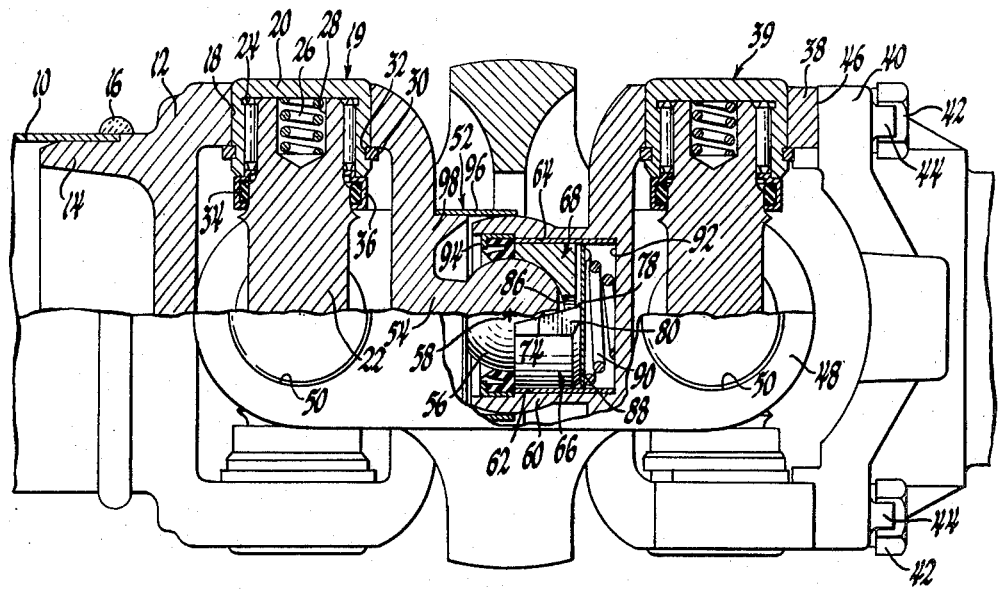
Figure 1 is an elevational view of a double Cardan constant velocity universal joint with parts broken away and in section to illustrate the construction of the centering device.

Referring more particularly to the drawings, a double Cardan constant velocity universal joint is illustrated in Figure 1.

A propeller shaft section 10 is secured to one yoke 12 of the universal joint, extending over a skirt 14 formed on the outward end of the yoke 12 and welded thereto as at 16. A pair of apertures 18 are formed through opposite sides of the yoke 12 to receive the usual spider and bearing assembly 19. A bearing cap 20, rotatably secured on the end of a spider 22, and an annulus of needle bearings 24, disposed between the bearing cap 20 and the spider 22, provide relatively frictionless rotation of the spider 22 within the bearing cap 20 during operation of the joint. A biasing spring 26 may be provided in a blind aperture 28 formed in the end of the spider 22, the spring abutting the interior of the bearing cap 26 and biasing it in an outward direction.

In order to retain the bearing cap in its proper position within the yoke 12, a retaining ring 30 is received in an annular groove 32 formed near the inner end of the bearing cap 20. A seal 34 and seal retainer 36 may be suitably secured about the spider 22, and adjacent the bearing cap 20, to retain the annulus of needle bearings 24 in its proper position and to prevent the entry of dirt and other foreign material to the bearing surfaces.

A second yoke member 38 is provided on the adjacent end of the next propeller shaft section (not shown) and extends toward the first yoke member 12. The construction of the bearing cap and spider assembly 39 is essentially the same as that above-described with respect to the assembly 19 mounted in yoke member 12.

In order to provide a means for easy disassembly of the joint, the yoke section 38 may be secured to the adjacent propeller shaft section by a flange member 40. The flange member 40 is bolted or otherwise removably secured to the yoke 38 as by bolts 42, secured in place by the bolt locks 44, such that when the bolts 42 are removed, the flange member 40 may be easily separated from the yoke 38 along the parting line 46.

A connecting member 48 of generally H-shape extends between the two yokes 12 and 38 and has bearing cap receiving apertures 50 formed therein to receive bearing cap and bearing assemblies secured on the spiders 22 and similar to assemblies 19 and 39. The connecting member 48 provides the structural torque transmitting connection between the yoke members 12 and 38.

In order to provide the constant velocity feature for the universal joint, it is essential that the center of angulation of each spider and bearing assembly, and each yoke, be maintained about the same point during the life of the joint. This is provided by a centering means, illustrated generally by the numeral 52. A stub shaft 54 extends inwardly from the center of the yoke member 12, toward the yoke member 38, and has a spherical ball 56 formed on the end thereof. The center 58 of the ball is located midway between the centers of the spiders 22. The center 58 is fixed with respect to the yoke 12, since the ball is an integral part thereof, and its position is fixed with respect to the yoke 38 in a manner to be later described.

An extension 60 extends inwardly from the center of the yoke member 38 and around the centering ball 56. The extension is provided with a cylindrical aperture 62 receiving the centering ball 56, and a cylindrical bushing 64 is disposed within the aperture to contain a pair of centering shoes 66 and 68.

Figure 2:
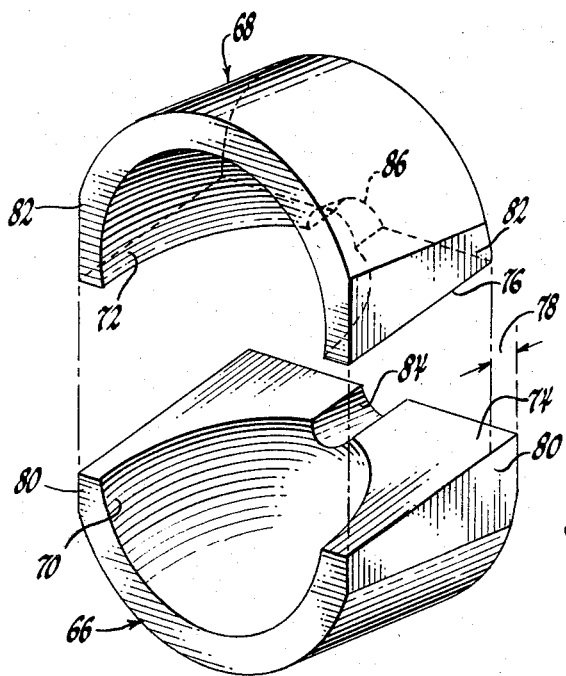
Figure 2 is an exploded perspective view of the centering shoes of the centering device illustrated in the universal joint of Figure 1.

The centering shoes 66 and 68, which are illustrated in more detail in Figure 2, each comprise a substantially semi-cylindrical member having a generally spherical cavity 70 and 72 formed therein. The cavities are so constructed as to form a hemispherical cavity when the shoes are placed adjacent each other, and to receive and form a bearing surface for the spherical centering ball 56. Each of the shoes 66 and 68 are provided with inclined surfaces 74 and 76 which are adapted to abut, thus forming a parting surface for the assembly which is located along a plane forming an angle with respect to the center line of the extension 60. The lower centering shoe 66 is slightly longer in an axial direction than the centering shoe 68, as illustrated by numeral 78, the purpose for which will be hereinafter described.

Flat vertical surfaces 80 and 82 are formed in the outer walls and central apertures 84 and 86 are provided through the end walls of the centering shoes 66 and 68, to provide a means for transmitting lubricant to the bearing surfaces between the centering ball 56 and the spherical cavities 70 and 72.

A washer or thin plate 88 is disposed within the aperture 62 in the extension 60, behind the centering shoes 66 and 68, and abuts the longer shoe 66. A spring 90, acting between the end wall 92 of the aperture 62 and the washer, or plate member, 88 biases the longer shoe 66 toward the centering ball 56, the purpose of which will be hereinafter described.

With the centering shoes 66 and 68 formed with the inclined parting surfaces, the shoes achieve a wedging effect between the centering ball 56 and the wall of the extension 60 and the bushing 64. This is accomplished by the spring 90 acting on the longer shoe 66, causing both shoes to move toward the centering ball 57 until the wall of the spherical cavity of either shoe contacts the ball 56. The centering ball 56 then moves slightly off center to contact the opposite shoe, due to the movement of the longer centering shoe 66 along the inclined surfaces 74 and 76, and the longer shoe 66 continues moving toward the centering ball 56 by the urging of the spring 90. Thus, the centering ball 56 becomes wedged between the centering shoes 66 and 68 and the shoes become wedged between the centering ball 56 and the bushing 64. This takes up all manufacturing tolerances and any wear that might occur between contacting surfaces in the centering device to eliminate vibrations, or the like, which would otherwise take place therebetween, and positively locates the centering ball with respect to the yoke 38 to maintain the center of angulation. With the parts wedged in position, the centering ball 56 is securely located at the mid-point of the double universal joint to provide a constant angular velocity for both propeller shaft sections.

A seal assembly 94 may be provided in the end of the extension 60 to prevent dirt, dust and other foreign materials from entering the bearing surfaces, and a tubular dust and dirt seal 96 may be provided about an extension 98 on the yoke 12, and engaging the extension 60, for a similar purpose.

Thus, it may be seen that a universal joint has been provided which eliminates any possibility of vibrations and chucking due to manufacturing tolerances or parts wear within the universal joint. With such features, a universal joint is provided which is adaptable to a wider variety of usages than heretofore possible.

What is claimed:

1. Centering means for a double Cardan constant velocity universal joint having first and second yoke members, said centering means comprising a stud extending from said first yoke member toward said second yoke member, a spherical ball formed on the end of said stud and having a center midway between said yoke members, a tubular extension formed from said second yoke member and extending toward and enclosing said ball, a pair of shoes disposed within said extension and having mating spherical cavities formed therein and engaging said ball, said shoes being adapted for wedging contact between said ball and said extension for eliminating clearances therebetween.

2. Centering means for a double Cardan constant velocity universal joint comprising first and second yoke members, a ball extending from said first yoke member toward said second yoke member, a tubular extension formed from said second yoke member and extending toward and enclosing said ball, a bushing in said extension, a pair of shoes disposed within said bushing and having spherical surfaces engaging said ball, said shoes having adjoining inclined surfaces angularly disposed with respect to the axis of said extension, one of said shoes being longer than the other of said shoes, and means biasing said longer shoe toward said ball for wedging said shoes between said bushing and said ball and eliminating clearances therebetween.

3. In a double Cardan universal joint having first and second yoke members, centering means comprising a ball extending from said first yoke member and toward said second yoke member, a tubular extension formed from said second yoke member and enclosing said ball, a pair of shoes disposed in said extension and having mating spherical surfaces engaging said ball, said shoes being joined in a plane angularly disposed with respect to the plane of the axis of said extension, one of said shoes being longer than the other of said shoes, and spring means biasing said one shoe toward said ball, said angularly disposed junction causing said shoes to wedge between said ball and said extension to eliminate clearances therebetween.

4. In a double Cardan constant velocity universal joint having first and second yoke members, centering means comprising a stud extending from said first yoke member and toward said second yoke member, a spherical ball formed on the end of said stud and having the center thereof midway between said first and second yoke members, a tubular extension formed from said second yoke member and enclosing said ball, a ball receiving socket disposed in said extension and including a pair of shoes, said shoes having mating inclined surfaces angularly disposed with respect to the axis of said extension, one of said shoes being longer than the other of said shoes, and a spring disposed in said extension and biasing said longer shoe toward said ball, said spring and said inclined surfaces causing said shoes to wedge between said ball and said extension to eliminate clearances therebetween.

5. A ball seat device for use with a constant velocity universal joint having first and second yoke members, a ball extending from said first yoke member and an extension formed from said second yoke member and surrounding said ball, said ball seat device comprising a first shoe having a cavity formed therein of substantially spherical shape, said first shoe forming substantially half of a right cylinder, a second shoe having a cavity of substantially spherical shape formed therein, said second shoe forming substantially half of a right cylinder and of greater axial length than said first shoe, said first and second shoes abutting along a plane angularly disposed with respect to the axes thereof, whereby said shoes may be inserted into said extension in said second yoke member and said cavities engage said ball formed on said first yoke member and said second shoe may be biased toward said ball and said angular abutment cause said shoes to wedge between said ball and said extension to eliminate any clearance therebetween.

References Cited in the file of this patent

UNITED STATES PATENTS

| | | |
|---|---|---|
| 1,979,768 | Pearce | Nov. 6, 1934 |
| 2,106,672 | Wollner | Jan. 25, 1938 |
| 2,255,762 | Dodge | Sept. 16, 1941 |